United States Patent Office 2,860,054
Patented Nov. 11, 1958

2,860,054

LIQUID PEPPER SOLUTION AND PROCESS OF PRODUCING THE SAME

Nicholas S. Yanick, Chicago, Ill., assignor to National Dairy Products Corporation, a corporation of Delaware No Drawing. Application October 29, 1956
Serial No. 618,677

12 Claims. (Cl. 99—140)

The present invention relates generally to a solution of oleoresin of a spice and, more particularly, this invention relates to a solution containing a high percentage of oleoresin of black pepper.

The pepper of commerce is derived from dried pods of a Piperaceae plant, and particularly the *Piper nigrum* plant. Normally, black pepper is prepared by grinding the whole dried pods, whereas white pepper is obtained by grinding only the inner portion of the dried pods. The pods are composed of cellulosic tissue, starch, sugars and resinous matter. The pods also include piperine, volatile oils and fixed oils.

It is the piperine which is responsible for the "bite" of the pepper and the volatile oils provide the aromatic characteristic of pepper. It will, therefore, be seen that a substantial portion of the pod does not contribute to the condiment.

In order to make more efficient use of pepper, it has become commercial practice to extract the piperine, volatile oil and fixed oil from the dried pepper pods by the use of a solvent, such as alcohol, acetone, or ethylene dichloride. After extraction, the solvent is removed, as by distillation, and there remains an extract of pepper which is called "oleoresin of black pepper."

This oleoresin is a heterogeneous mass which, as indicated, is composed of piperine, resinous materials, volatile oil and fixed oil. The piperine is insoluble in the resinous material and oils but, upon stirring, the piperine and resinous material become suspended in the oil medium. However, upon standing, the resin and piperine settle out of the oil. As a consequence, resin is not readily used in the flavoring of food products, largely for the reason that the tendency of the constituents of the oleoresin to separate results in non-uniformity of flavor.

In order to overcome the separation difficulty, and to provide uniform dispersion of pepper in food products which are flavored thereby, the oleoresin has been dispersed on a solid base such as salt or sugar, the resulting condiment comprising about 5 percent oleoresin. Such condiment has been available for many years and is referred to in commerce as "soluble" black pepper. However, in this form, the oleoresin is exposed to atmospheric conditions and deteriorates so that the oleoresin loses its desirable aroma and flavor characteristics. It is often disadvantageous to use the soluble black pepper because of the relatively low concentration of oleoresin, i. e. about 5 percent, on the base. Furthermore, such low concentration increases in the cost of handling, transportation and storage of the soluble black pepper.

Various attempts have been made to solubilize the oleoresin of black pepper. For example, a patent to Schumm, No. 2,680,690, discloses the use of anhydrous lactic acid to solubilize piperine. While anhydrous lactic acid, which is rather difficult to maintain in an anhydrous condition, effectively solubilizes piperine, difficulty has been experienced in maintaining a homogeneous solution of all of the ingredients of the oleoresin of black pepper at high concentrations of the oleoresin.

A patent to Johnstone et al. No. 2,626,218, is also directed to solubilizing the oleoresin of black pepper, and suggests the use of a substantially anhydrous, normally liquid organic acid, which acid is substantially miscible with the essential oils of oleoresin. However, this patent discloses the need for removing the fixed oils from the oleoresin of pepper, and is limited to the use of normally liquid organic acids.

An application to Fagen, Serial No. 453,429, now Patent No. 2,778,738, which application has been assigned to the assignee of this invention, discloses solubilizing oleoresin of pepper in propylene glycol. However, the degree of solubility is limited to about 33 percent of oleoresin in propylene glycol.

It is the object of this invention to provide an improved solution of oleoresin of spices. It is a further object of the invention to provide such a solution of oleoresin of spices, the oleoresin being present in an amount in excess of about 50 percent and the fixed oils being present in the solution.

In accordance with this invention, oleoresin of a spice is prepared in a usual way and the oleoresin is dissolved in an anhydrous solution comprising: ethyl alcohol; an organic acid which may either be a liquid organic acid, such as acetic, levulinic or pyruvic acid, or a solid organic acid such as citric acid, sorbic acid or benzoic acid; and a compound having an acetate radical, such as mono-, di-, or tri-acetin.

Since the solution is to be used in food products, the alcohol is almost necessarily ethyl alcohol. The acid which is used desirably should not contribute a substantial flavor to the solution, and this is also true of the acetate providing compound. In view of this flavor limitation, the acetate providing compound is almost necessarily an ester of a polyhydric alcohol. Since it is desirable that the solution be free flowing, the alcohol-acid-acetate compound solution should be free flowing. For this reason, the acid and acetate providing compounds should have low viscosity at ambient conditions.

In order to provide the most satisfactory results, and a solution containing more than about 50 percent oleoresin, the solution should comprise from about 15 to about 30 percent alcohol. The acid should provide about 10 percent of the solution and the acetate providing compound comprise from about 5 percent to about 15 percent of the solution. It is not necessary that only one acid be used and, in this connection, one or more organic acids may be used in the solution. Nevertheless, the total acid content should be about 10 percent. The amount of the alcohol relative to the amount of acetate providing compound may be varied to provide the desired viscosity but, the aggregate of the percent of alcohol and the percent of acetate providing compound should be between about 30 percent and about 40 percent.

As before indicated, the result sought is a homogeneous solution containing the piperine, resins, volatile oil and fixed oils. The alcohol, acid and acetate providing compound are adjusted to solubilize these ingredients of the oleoresin into a homogeneous solution. It has been found that by adjustment of these constituents, oleoresin can be made into a homogeneous solution at percentages as high as 60 percent.

In preparing the solution of the invention, black pepper corns are ground and mixed with acetone, it being understood that other solvents may be used. The oleoresin is extracted in the conventional type of continuous extraction apparatus until the extraction of the oleoresin is completed. Upon completion of the extract, the insoluble materials, such as the cellulosic materials, the starches and sugars are removed. The solvent is partially evaporated by distillation, whereupon the solvent blend of the invention is added.

In a particular example, the solvent blend comprised 62.5 percent ethyl alcohol, 12.5 percent citric acid, 12.5 percent sorbic acid and 12.5 percent triacetin. After addition of the solvent blend, the evaporation is continued until the last trace of acetone is removed.

If the oleoresin of commerce is obtained, the solvent blend is added to the oleoresin and stirred at a temperature of about 155° F. for about 25 minutes. The solution may then be cooled and packed. Upon long standing of as much as 14 months, there was no separation of fixed oils, volatile oils, piperine or resin from the solution.

For purposes of further describing the invention, the following oleoresin of black pepper mixtures were prepared in accordance with the foregoing procedures, the percentage being on a weight basis:

| | | Percent |
|---|---|---|
| (1) | Ethyl alcohol | 30 |
| | Citric acid | 10 |
| | Triacetin | 10 |
| | Oleoresin | 50 |
| (2) | Ethyl alcohol | 25 |
| | Citric acid | 5 |
| | Sorbic acid | 5 |
| | Triacetin | 5 |
| | Oleoresin | 60 |
| (3) | Ethyl alcohol | 18 |
| | Sorbic acid | 10 |
| | Triacetin | 12 |
| | Oleoresin | 60 |
| (4) | Ethyl alcohol | 25 |
| | Citric acid | 15 |
| | Triacetin | 10 |
| | Oleoresin | 50 |
| (5) | Ethyl alcohol | 18 |
| | Citric acid | 7 |
| | Sorbic acid | 3 |
| | Triacetin | 12 |
| | Oleoresin | 60 |
| (6) | Ethyl alcohol | 22.5 |
| | Citric acid | 12.5 |
| | Triacetin | 10 |
| | Oleoresin | 55 |
| (7) | Ethyl alcohol | 25 |
| | Citric acid | 6 |
| | Benzoic acid | 4 |
| | Triacetin | 10 |
| | Oleoresin | 55 |
| (8) | Ethyl alcohol | 25 |
| | Citric acid | 7 |
| | Sorbic acid | 3 |
| | Triacetin | 10 |
| | Oleoresin | 55 |
| (9) | Ethyl alcohol | 25 |
| | Citric acid | 7 |
| | Sorbic acid | 3 |
| | Diacetin | 10 |
| | Oleoresin | 55 |
| (10) | Ethyl alcohol | 25 |
| | Levulinic acid | 10 |
| | Triacetin | 10 |
| | Oleoresin | 55 |
| (11) | Ethyl alcohol | 25 |
| | Citric acid | 6 |
| | Pyruvic acid | 4 |
| | Triacetin | 10 |
| | Oleoresin | 55 |

The foregoing mixtures have no undesirable flavor, have excellent stability and may be easily prepared. The mixtures have utility in the manufacture of salad dressings, as well as many other food products.

It will be seen that with the solvent blend of the invention, all of the constituent materials of oleoresin are solubilized. It will also be seen that the mixtures, with the solvent of the invention, dissolve in excess of 50 percent oleoresin, so that large amounts of oleoresin may be stored and handled with facility. Furthermore, with the solvent of the invention, solid organic acids may be utilized as well as liquid organic acids. In addition, the solution of the invention contains only a small amount of acid which may be desirable for certain purposes for which the solution may be used.

The various features of the invention which are believed to be new are set forth in the following claims.

I claim:

1. A process of producing a homogeneous, substantially anhydrous liquid pepper solution which comprises adding to, and mixing with, an oleoresin of pepper, containing piperine, resin, fixed oil and volatile oil, an acetate providing compound, an anhydrous organic acid and alcohol, and adjusting the relative amount of alcohol, acid, and acetate providing compound to provide a final concentration of acid of not more than about 15 percent and to solubilize the oleoresin.

2. A process of producing a homogeneous, substantially anhydrous liquid pepper solution which comprises adding to, and mixing with, an oleoresin of pepper, containing piperine, resin, fixed oil and volatile oil, an acetate containing compound comprising between about 5 percent and about 15 percent of said solution, an anhydrous organic acid and alcohol, said alcohol comprising between about 15 percent and about 30 percent of said solution, the acid comprising from about 10 percent to about 15 percent of said solution, the alcohol and acetate containing compound comprising, in the aggregate, from about 30 percent to about 40 percent of said solution.

3. A process of producing a homogeneous, substantially anhydrous liquid pepper solution which comprises adding to, and mixing with, an oleoresin of pepper, containing piperine, resin, fixed oil and volatile oil, an acetate ester of polyhydric alcohol, and anhydrous organic acid, and alcohol, and adjusting the relative amount of alcohol, acid and ester to provide a final concentration of acid of not more than about 15 percent and to solubilize the oleoresin.

4. A process of producing a homogeneous, substantially anhydrous liquid pepper solution which comprises adding to, and mixing with, an oleoresin of pepper, containing piperine, resin, fixed oil and volatile oil, a glycerol acetate, an anhydrous normally solid organic acid, and alcohol, and adjusting the relative amount of acid, alcohol and acetate to provide a final concentration of acid of not more than about 15 percent and to solubilize the oleoresin.

5. A process of producing a homogeneous, substantially completely anhydrous liquid pepper solution which comprises adding to, and mixing with, an oleoresin of pepper, containing piperine, resin, fixed oil and volatile oil, an acetate selected from the group consisting of mono-, di- and tri-acetin, and anhydrous normally solid organic acid, and ethyl alcohol, and adjusting the relative amount of acid, alcohol and acetate to provide a final concentration of acid of between about 10 percent and about 15 percent and to solubilize the oleoresin.

6. A process for producing a homogeneous, substantially completely anhydrous liquid pepper solution which comprises adding to, and mixing with, an oleoresin of pepper containing piperine, resin, fixed oil and volatile oil, an acetate providing compound, a substantially anhydrous normally solid organic acid, and ethyl alcohol; and adjusting the relative amount of alcohol, acid, and acetate providing compound to provide a final concentration of acid of about 10 percent and to solubilize the oleoresin to a final concentration of up to about 60 percent.

7. A substantially anhydrous, homogeneous liquid pepper solution which comprises an oleoresin of pepper containing piperine, resin, fixed oil and volatile oil, an acetate containing compound, a substantially anhydrous, normally solid organic acid in a concentration of not more than about 15 percent, and an edible alcohol.

8. A substantially anhydrous, homogeneous liquid pepper solution which comprises an oleoresin of pepper containing piperine, resin, fixed oil and volatile oil, an acetate containing compound, a substantially anhydrous, normally solid organic acid, and an edible alcohol, the acid comprising from about 10 percent to about 15 percent of the solution, the alcohol and acetate providing compound comprising, in the aggregate, from about 30 percent to about 40 percent of the solution.

9. A substantially anhydrous, homogeneous liquid pepper solution which comprises an oleoresin of pepper containing piperine, resin, fixed oil and volatile oil, an acetate selected from the group consisting of mono-, di- and tri-acetin, a substantially anhydrous, normally solid organic acid in a final concentration of between about 10 percent and about 15 percent, and an edible alcohol.

10. A substantially completely anhydrous, homogeneous liquid pepper solution comprising about 50 percent of oleoresin of pepper, about 10 percent tri-acetin, about 10 percent citric acid, and about 30 percent ethyl alcohol.

11. A substantially completely anhydrous, homogeneous liquid pepper solution comprising about 60 percent of oleoresin of pepper, about 5 percent of citric acid, about 5 percent sorbic acid, about 5 percent of tri-acetin and about 25 percent ethyl alcohol.

12. A substantially completely anhydrous, homogeneous liquid pepper solution comprising about 55 percent of oleoresin of pepper, about 7 percent citric acid, about 3 percent sorbic acid, about 10 percent tri-acetin, and about 25 percent ethyl alcohol.

References Cited in the file of this patent

UNITED STATES PATENTS

| | | |
|---|---|---|
| 1,285,555 | Bradley | Nov. 19, 1918 |
| 1,378,099 | Esselen | May 17, 1921 |
| 2,626,218 | Johnstone et al. | Jan. 20, 1953 |
| 2,680,690 | Schumm | June 8, 1954 |